(12) United States Patent
Takeda et al.

(10) Patent No.: US 11,716,709 B2
(45) Date of Patent: Aug. 1, 2023

(54) USER TERMINALS AND RADIO COMMUNICATION METHODS

(71) Applicant: NTT DOCOMO, INC., Tokyo (JP)

(72) Inventors: Kazuki Takeda, Tokyo (JP); Tooru Uchino, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 174 days.

(21) Appl. No.: 16/373,067

(22) Filed: Apr. 2, 2019

(65) Prior Publication Data

US 2019/0230661 A1 Jul. 25, 2019

Related U.S. Application Data

(63) Continuation of application No. 15/110,958, filed as application No. PCT/JP2015/050571 on Jan. 13, 2015, now abandoned.

(30) Foreign Application Priority Data

Jan. 14, 2014 (JP) .................................. 2014-004212

(51) Int. Cl.
*H04W 72/0446* (2023.01)
*H04L 5/00* (2006.01)
(Continued)

(52) U.S. Cl.
CPC ......... *H04W 72/0446* (2013.01); *H04L 5/001* (2013.01); *H04L 5/0073* (2013.01); (Continued)

(58) Field of Classification Search
CPC .... H04W 72/0446; H04W 8/22; H04L 5/001; H04L 5/1469; H04L 5/0073; H04L 5/0044
See application file for complete search history.

(56) References Cited

U.S. PATENT DOCUMENTS

2010/0041350 A1* 2/2010 Zhang .................. H04L 5/0044
455/101
2010/0074305 A1* 3/2010 Lee ...................... H04L 5/0023
375/135
(Continued)

FOREIGN PATENT DOCUMENTS

| CN | 101414902 A | 4/2009 |
| JP | 2011250386 A | 12/2011 |
| JP | 2013118646 A | 6/2013 |

OTHER PUBLICATIONS

International Search Report issued in corresponding application No. PCT/JP2015/050571 dated Apr. 14, 2015 (6 pages).
(Continued)

*Primary Examiner* — Chirag G Shah
*Assistant Examiner* — Joshua Smith
(74) *Attorney, Agent, or Firm* — Osha Bergman Watanabe & Burton LLP

(57) ABSTRACT

In one aspect, a user terminal is disclosed including a processor that controls a mapping of a first demodulation reference signal (DMRS), having a fixed location regardless of a symbol duration of an uplink shared channel (PUSCH), controls a mapping of a second DMRS, which is allocated depending on the symbol duration of the PUSCH, and determines a location of the second DMRS if the second DMRS is allocated. The user terminal also includes a transmitter that transmits at least one of the first DMRS and the second DMRS.

7 Claims, 20 Drawing Sheets

| NUMBERS OF UpPTS SYMBOLS | 1st DMRS | 2nd DMRS |
|---|---|---|
| 1 | - | - |
| 2 | - | - |
| 3 | - | - |
| 4 | - | 10 |
| 5 | - | 10 |
| 6 | 8 | 10 |
| 7 | 8 | 10 |
| 8 | 7 | 10 |
| 9 | 7 | 10 |
| 10 | 6 | 10 |

(51) Int. Cl.
*H04L 5/14* (2006.01)
*H04W 8/22* (2009.01)

(52) U.S. Cl.
CPC ............. *H04L 5/1469* (2013.01); *H04W 8/22* (2013.01); *H04L 5/0044* (2013.01)

(56) References Cited

U.S. PATENT DOCUMENTS

| | | | |
|---|---|---|---|
| 2010/0226326 A1* | 9/2010 | Ahn | H04W 72/1278 370/329 |
| 2010/0278080 A1 | 11/2010 | Pan et al. | |
| 2010/0296451 A1 | 11/2010 | Li et al. | |
| 2011/0105167 A1* | 5/2011 | Pan | H04L 27/2647 455/507 |
| 2011/0116436 A1* | 5/2011 | Bachu | H04L 5/0048 370/312 |
| 2011/0286440 A1* | 11/2011 | Chung | H04W 72/23 370/342 |
| 2012/0039287 A1 | 2/2012 | Ko et al. | |
| 2012/0155414 A1* | 6/2012 | Noh | H04L 5/0023 370/329 |
| 2012/0163320 A1 | 6/2012 | Akimoto et al. | |
| 2012/0163335 A1* | 6/2012 | Chung | H04L 5/0023 370/329 |
| 2012/0269285 A1 | 10/2012 | Jeong et al. | |
| 2013/0039305 A1 | 2/2013 | Kishiyama et al. | |
| 2013/0077660 A1* | 3/2013 | Ko | H04W 72/02 375/219 |
| 2013/0343322 A1* | 12/2013 | Lee | H04W 72/0413 370/329 |
| 2014/0023012 A1* | 1/2014 | Sato | H04L 5/14 370/329 |
| 2014/0086112 A1* | 3/2014 | Stern-Berkowitz | H04L 1/1822 370/280 |
| 2014/0092921 A1 | 4/2014 | Seo et al. | |
| 2014/0161085 A1 | 6/2014 | Kim et al. | |
| 2014/0301346 A1 | 10/2014 | Seo et al. | |
| 2015/0043392 A1 | 2/2015 | Susitaival et al. | |
| 2015/0078222 A1 | 3/2015 | Yang et al. | |
| 2015/0249526 A1* | 9/2015 | Kim | H04L 5/0051 370/329 |
| 2015/0327263 A1 | 11/2015 | Chen et al. | |
| 2016/0112994 A1* | 4/2016 | Wang | H04L 5/0094 370/329 |

OTHER PUBLICATIONS

Written Opinion of the International Searching Authority issued in corresponding application No. PCT/JP2015/050571 dated Apr. 14, 2015 (6 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in the counterpart Japanese Patent Application No. 2014-004212, dated Dec. 12, 2017 (5 pages).
NEC; "On the need to extend coverage enhancement for Configurations #2, #3, #4, #5"; 3GPP TSG RAN WG1 Meeting #75, R1-135261; San Francisco, USA, Nov. 11-15, 2013 (6 pages).
China Telecom (Rapporteur); "Email discussion on remaining issues of LTE coverage enhancements"; 3GPP TSG RAN WG1 Meeting #75, R1-135281; San Francisco, US, Nov. 11-15, 2013 (22 pages).
Office Action issued in the counterpart Chinese Patent Application No. 201911132162.X, dated Dec. 8, 2021 (12 pages).
Office Action issued in the counterpart Chinese Patent Application No. 201910475237.8, dated Mar. 29, 2022 (15 pages).
Office Action issued in the counterpart Chinese Patent Application No. 201910475237.8, dated Oct. 9, 2022 (13 pages).

* cited by examiner

| DL/UL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |
| 7 | D | D | D | D | D | D | D | D | D | D |

FIG.3A

| DL/UL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |
| 7 | D | S | D | D | D | D | D | D | D | D |

D : DL SUBFRAME    U : UL SUBFRAME    S : SPECIAL SUBFRAME

FIG.3B

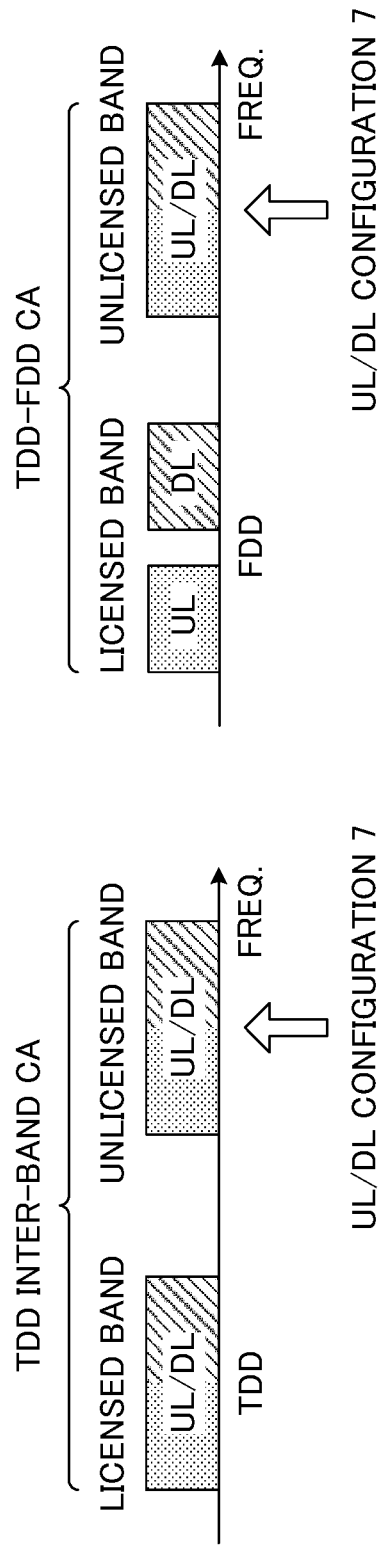

| SP-SF CONFIG | NORMAL CP IN DL | | | EX. CP IN DL | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | 5 | 5 | 2 |
| 8 | 11 | 1 | 2 | – | – | – |
| 9 | 6 | 6 | 2 | – | – | – |

| SP-SF CONFIG | NORMAL CP IN DL | | | EX. CP IN DL | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | 5 | 5 | 2 |
| 8 | 11 | 1 | 2 | – | – | – |
| 9 | 6 | 6 | 2 | – | – | – |
| 10 | 3 | 2 | 9 | 3 | 2 | 7 |

FIG.7

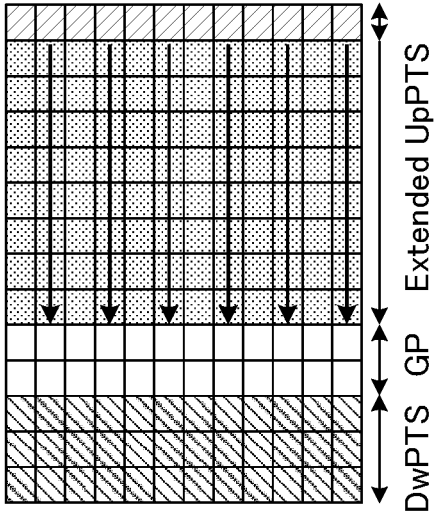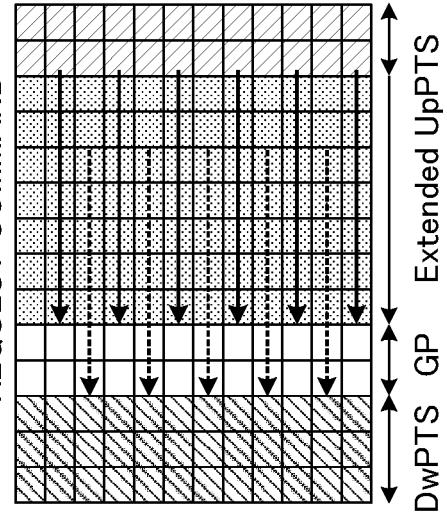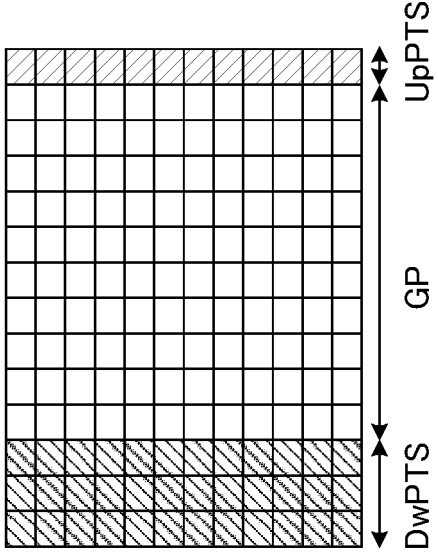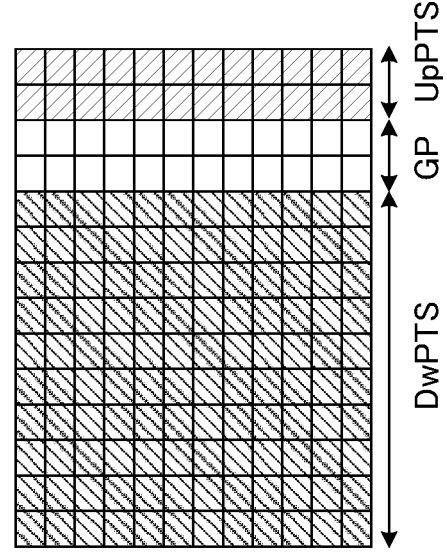
FIG.8A
FIG.8B

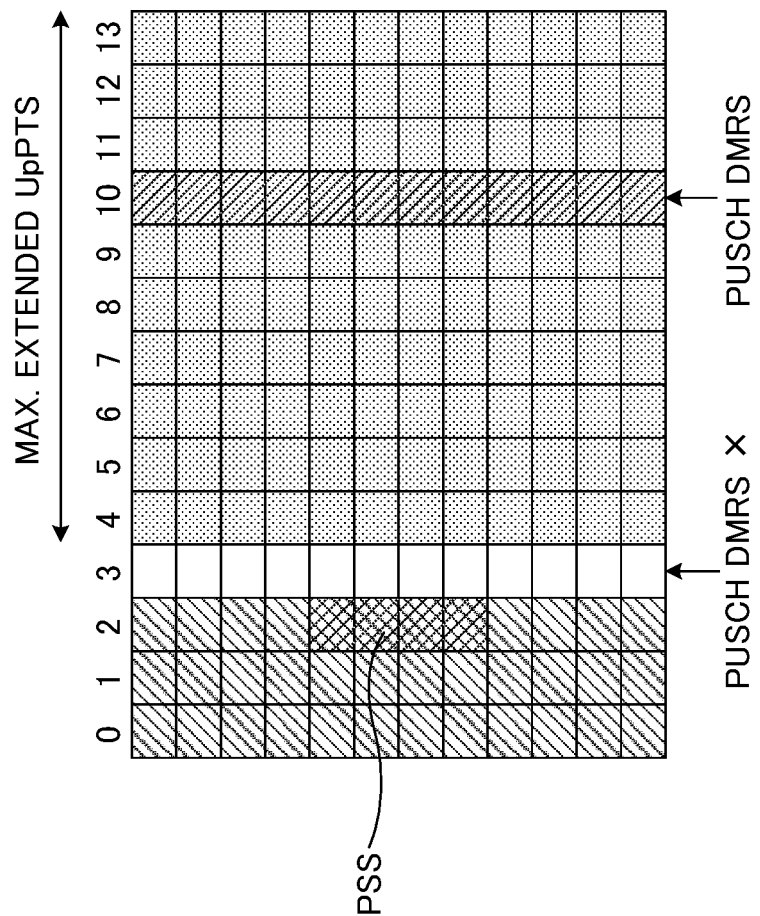

USER TERMINALS AND RADIO COMMUNICATION METHODS

CROSS-REFERENCE TO RELATED APPLICATIONS

The present application is a continuation application of and, thereby, claims benefit under 35 U.S.C. § 120 to U.S. patent application Ser. No. 15/110,958 filed on Jul. 12, 2016, which is a national stage application of PCT Application No. PCT/JP2015/050571, filed on Jan. 13, 2015, which claims priority to Japanese Patent Application No. 2014-004212 filed on Jan. 14, 2014. The content of these applications is incorporated by reference in their entirety.

TECHNICAL FIELD

The present invention relates to a user terminal, a radio base station and a radio communication method that are applicable to a next-generation communication system.

Back Ground Art

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Re. 10/11).

As duplex modes for radio communication in LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In the event of TDD, the same frequency region is employed in both uplink and downlink communication, and signals are transmitted and received to and from one transmitting/receiving point by dividing between the uplink and the downlink based on time.

In TDD in LTE systems, a plurality of frame configurations (UL/DL configurations) with varying transmission ratios between uplink subframes (UL subframes) and downlink subframes (DL subframes) are stipulated. To be more specific, as shown in FIG. 2, seven frame configurations—namely, UL/DL configurations 0 to 6—are stipulated, where subframes #0 and #5 are allocated to the downlink, and subframe #2 is allocated to the uplink. In each UL/DL configuration, a special subframe is configured where a switch is made from DL to UL.

Also, the system band of LTE-A systems (Rel. 10/11) includes at least one component carrier (CC), where the LTE system band constitutes one unit. Gathering a plurality of component carriers (cells) to make a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

When carrier aggregation (CA), which was introduced in Rel. 10, is employed, in TDD, geographically-neighboring transmitting points are confined to the use of the same UL/DL configuration in a given frequency carrier in order to prevent interference between a plurality of CCs (also referred to as "cells," "transmitting/receiving points," etc.). However, generally speaking, DL traffic and UL traffic are asymmetrical. Also, the ratio between DL traffic and UL traffic is not constant, and varies over time or between locations. So, in order to enable flexible switching of UL/DL configurations in accordance with traffic, Rel. 11 provided support for CA (TDD inter-band CA) to employ different UL/DL configurations between different cells.

Also, in carrier aggregation (CA) in Rel. 10/11, the duplex modes to apply between a plurality of CCs need to be the same duplex mode (see FIG. 1B). On the other hand, future radio communication systems (for example, Rel. 12 and later versions) may anticipate CA to employ different duplex modes (TDD+FDD) between multiple CCs (see FIG. 1C).

Provided that the mode of use of these radio communication systems have been growing in variety, there is even a stronger demand for controlling UL communication and DL communication flexibly taking into account traffic and so on. For example, there is a demand to optimize throughput when TDD is used in an environment where the data traffic is unevenly concentrated on the downlink. However, when existing mechanisms (for example, existing UL/DL configurations in TDD) are used in new modes of use of radio communication systems, there is a threat of making it difficult to improve throughput or support new modes of use.

The present invention has been made in view of the above, and it is therefore an object of the present invention to provide a user terminal, a radio base station and a radio communication method, which can improve throughput, and which furthermore can support various modes of use of radio communication systems when TDD is used in an environment in which the data traffic is unevenly concentrated on the downlink.

The user terminal according to the present invention provides a user terminal that carries out radio communication with a TDD cell, and this user terminal has a transmitting/receiving section that transmits and receives signals by using a UL/DL configuration, which includes a special subframe formed with a downlink time duration, a guard period and an uplink time duration, and in which DL communication is carried out in all subframes, and a control section that controls an arrangement of an uplink demodulation reference signal based on a length of the uplink time duration constituting the special subframe.

Advantageous Effects of Invention

According to the present invention, it is possible to improve throughput and furthermore support various modes of use of radio communication systems when TDD is used in an environment in which the data traffic is unevenly concentrated on the downlink.

BRIEF DESCRIPTION OF DRAWINGS

FIGS. 3A and 3B provide diagrams to show examples of UL/DL configurations 7 for DL communication, for use in TDD cells;

FIGS. 4A and 4B provide diagrams to show examples of system structures where CA is applied to cells that operate in licensed areas and cells that operate in unlicensed areas;

FIG. 7 is a diagram to show other examples of special subframe configurations for use in TDD cells according to an embodiment;

FIGS. 8A and 8B provide diagrams to show cases where the length of the UpPTS in a special subframe configuration is extended based on a command from a radio base station;

FIG. 9 is a diagram to show an example of a PUSCH format in a special subframe in which the length of the UpPTS is extended;

DESCRIPTION OF EMBODIMENTS

Figure 1A:
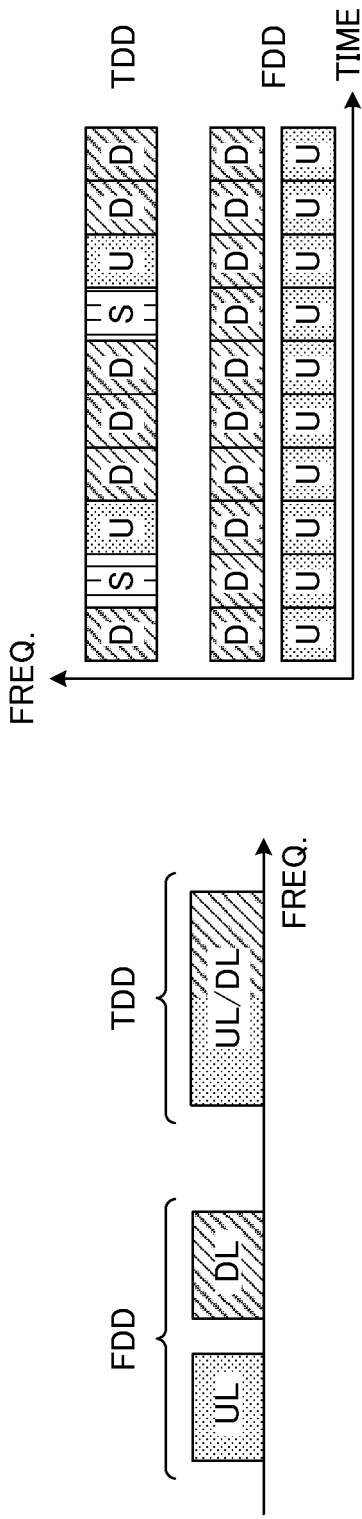
FIGS. 1A, 1B, and 1C provide diagrams to explain an overview of duplex modes in LTE and LTE-A, and intra-base station CA (intra-eNB CA)
Figure 2:
FIG. 2 is a diagram to show UL/DL configurations for use in TDD cells of existing systems.

As noted earlier, in LTE and LTE-A systems, two duplex modes—namely, FDD and TDD—are stipulated (see FIG. 1A). Also, in TDD, communication is carried out between a radio base station and a user terminal by using a predetermined UL/DL configuration that is selected from UL/DL configurations 0 to 6 shown in above FIG. 2. In this way, in TDD, the transmission ratio of UL subframes and DL subframes varies per UL/DL configuration, and the delivery acknowledgement signal (A/N) feedback mechanism (HARQ mechanism) and others are stipulated for each configuration.

Figure 1C:
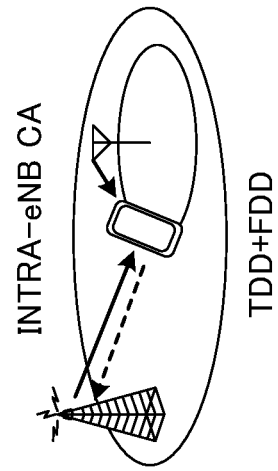
Figure 1B:
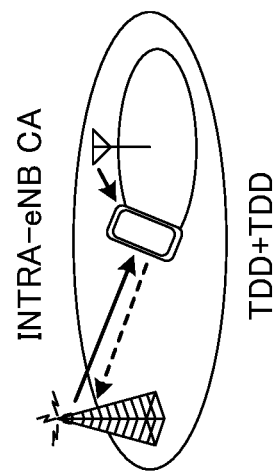

On the other hand, future radio communication systems (for example, Rel. 12 and later versions) may anticipate CA to employ different duplex modes (TDD+FDD) between multiple CCs (see FIG. 1C). In this case, it may be possible to employ UL/DL configurations 0 to 6 in cells where TDD is employed (hereinafter also referred to as "TDD cells"), as in existing systems (for example, Rel. 10/11). However, when CA is employed in a plurality of cells including TDD cells, there is a threat that it is difficult to optimize the throughput with existing UL/DL configurations.

For example, assume an example in which a predetermined cell among a plurality of cells employing CA is used for DL communication in a communication environment where the DL traffic is heavier than the UL traffic. In this case, if the cell that is selected for DL communication is a cell to employ FDD (hereinafter also referred to as an "FDD cell"), DL communication will be possible in every subframe. On the other hand, if the cell that is selected for DL transmission is a TDD cell, it may be possible to employ the UL/DL configuration in which the configuration ratio of DL subframes is the highest (in FIG. 2, UL/DL configuration 5).

However, even when DL/UL configuration 5 with the highest DL subframe configuration ratio is employed, a UL subframe and a special subframe are included (SF #1 and SF #2). That is, because at least a UL subframe is included in existing UL/DL configurations, when a TDD cell is used for DL communication, there will be subframes that cannot be used in DL data communication (for example, SF #2). As a result of this, sufficient improvement of throughput cannot be achieved. Note that, since a special subframe is formed with a downlink time duration (DwPTS), a guard period (GP) and an uplink time uplink time duration (UpPTS), so that DL communication can be carried out using the DwPTS.

So, the present inventors have focused on the fact that, when CA is carried out using a plurality of cells including TDD cells, it may not be possible to optimize throughput with existing UL/DL configurations, depending on the mode of use of the system, and have been studying the use of new UL/DL configurations. To be more specific, in TDD cells, a UL/DL configuration for DL communication, which enables DL communication in all subframes (hereinafter also referred to as a "UL/DL configuration 7") will be newly introduced. Furthermore, this UL/DL configuration 7 can be suitably applied to cases where a TDD cell is a secondary cell (SCell) (not the primary cell (PCell)).

Here, the primary cell (PCell) refers to the cell that manages RRC connection, handover and so on when CA is executed, and is also a cell that requires UL communication in order to receive data and feedback signals from terminals. When CA is executed, the primary cell is always configured in the uplink and the downlink. A secondary cell (SCell) refers to another cell that is configured apart from the primary cell when CA is employed. A secondary cell may be configured in the downlink alone, or may be configured in both the uplink and the downlink at the same time.

In this way, by employing UL/DL configuration 7 for DL communication depending on the mode of use of radio communication systems, it becomes possible to improve throughput. Note that, with UL/DL configuration 7 for DL communication, the case to provide DL subframes alone (without configuring special subframes) (see FIG. 3A) and the case to provide DL subframes and special subframes (see FIG. 3B) may be possible, depending on the mode of use.

Now, for future radio communication systems, studies are in progress to operate LTE systems not only in frequency bands licensed to businesses (licensed bands), but also in frequency bands where license is not required (unlicensed bands). A licensed band refers to a band in which a specific business is allowed exclusive use, and an unlicensed band refers to a band which is not limited to a specific business and in which radio stations can be provided. Unlicensed bands include, for example, the 2.4 GHz band and the 5 GHz band where WiFi and Bluetooth (registered trademark) can be used, the 60 GHz band where millimeter-wave radars can be used, and so on.

Unlike a licensed band, an unlicensed band is not for use only by a specific business, and therefore there is a possibility that unpredicted interference is produced. For example, there is a possibility that an LTE system and another radio communication system (a weather and aircraft surveillance radar, broadcast, emergency radio, public radio, local radio, WiFi, Bluetooth and so on) operate (that is, share frequencies) in an unlicensed band. In this case, there is a threat that, between the varying radio communication systems, interference that neither radio communication system has predicted will be produced.

In order to reduce the interference between the varying radio communication systems, it may be possible to execute control so that one of the radio communication systems is operated preferentially. For example, there is a possibility that the other radio communication system is stipulated to be prioritized over the LTE system. In this case, if the other prioritized radio system is detected to be in operation in the unlicensed band, communication using the LTE system has to stop.

Also, there is a possibility that different LTE businesses operate LTE systems by using the same frequency in an unlicensed band. For example, when different businesses install LTE base stations in close locations and operate these in the same frequency, significant interference is likely to be produced against each other. Consequently, in the mode of use to operate LTE systems by using unlicensed bands, it is necessary, as noted above, to take into account interference and so on.

Assuming cases where LTE systems are operated in unlicensed bands, in addition to licensed bands, the present inventors have been contemplating the use of above UL/DL configuration 7 in unlicensed bands (see FIG. 4). For example, a mode of use to operate an FDD cell in a licensed band and a TDD cell in an unlicensed band (UL/DL configuration 7) and apply CA between the FDD cell and the TDD cell may be possible (see FIG. 4B). Alternatively, a mode of use to operate TDD cells in a licensed band and an unlicensed band and apply CA between the TDD cells may be possible as well (see FIG. 4A).

Licensed bands allow businesses to control interference by operating base stations, and therefore can be used to communicate control signals and data that requires high quality. Meanwhile, despite the possibility that unpredicted interference may be produced, unlicensed bands can use comparatively wide bands, and therefore can be suitably used in data communication (DL communication) in which the traffic of packets and so on is heavy. Consequently, by executing CA by using UL/DL configuration 7 in TDD cells in unlicensed bands, it is possible to realize communication that takes advantage of both licensed bands and unlicensed bands.

Furthermore, in future radio communication systems, it may be possible to operate TDD cells, which have heretofore been used as secondary cells (SCells) as mentioned earlier, as cells that allow connection even when CA is not configured (that is, without requiring communication by the primary cell (PCell) as a precondition). To be more specific, it may be possible to employ cells to allow initial connection from user terminals (stand-alone) or as cells to allow independent scheduling (dual connectivity). Note that cells that operate on a stand-alone basis can establish initial connection with user terminals independently (that is, without being secondary cells (SCells) in CA). Also, dual connectivity refers to the mode in which user terminals connect with a plurality of cells that are scheduled independently (that is, have schedulers).

Although, in such mode of use, UL communication needs to be carried out in TDD cells, the difficulty in this case lies in how to use UL/DL configuration 7 and communicate. That is, in order to use UL/DL configuration 7 in stand-alone or in dual connectivity, it is necessary to support uplink channels, uplink reference signals and so on. For example, it is necessary to at least transmit uplink signals such as the PRACH signal, message 3 in random access procedures, higher layer control signals, downlink HARQ-ACK (delivery acknowledgement signal), CQI (channel quality information), SR (scheduling request signal), SRS (channel quality measurement reference signal) and so on, by using UL/DL configuration 7.

Consequently, it may be possible to use the configuration of above FIG. 3B, which provides uplink timings (includes special subframes), as UL/DL configuration 7. However, in the special subframe configurations of existing LTE systems (Rel. 10/11), it is not possible to transmit uplink signals by using the above-noted uplink time duration (UpPTS). Now, existing special subframe configurations (Sp-SF Configs.) will be described below in detail with reference to FIG. 5.

Figures 5A, 5B:
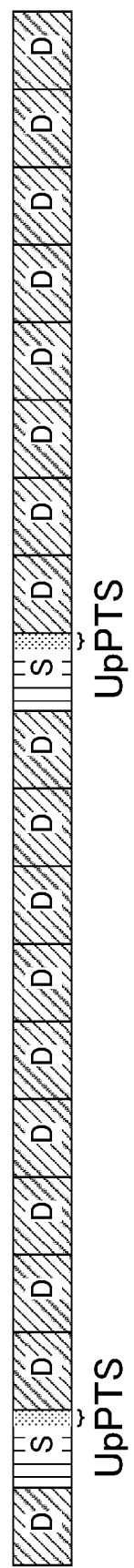
FIGS. 5A and 5B provide diagrams to show existing special subframe configurations.

In existing LTE systems (Rel. 10/11), ten types special subframe configurations (Sp-SF Configs.) are provided for normal CPs and eight types are provided for extended CPs (see FIG. 5A). Also, information about the special subframe configurations is reported to user terminals by using system information (SIB1) in the primary cell, and by using RRC signaling in secondary cells.

The numbers shown in the table of FIG. 5A are the numbers of OFDM (or SC-FDMA) symbols. In an existing special subframe configuration, the uplink time duration (UpPTS) is configured only up to maximum two symbols. Consequently, it is not possible to transmit user data (PUSCH signals), which is transmitted by using the PUSCH in UL subframes, or uplink control signals (PUCCH signals), which are transmitted by using the PUCCH, and so on. Meanwhile, in existing special subframes, only the transmission of PRACH signals and SRSs is supported for UL communication. Consequently, when above-mentioned UL/DL configuration 7 is used (see FIG. 5B), it is not possible to transmit UL signals (user data, uplink control information and so on) that would be required when operation apart from secondary cells (SCell) is assumed, in existing special subframe configurations.

Figure 6:
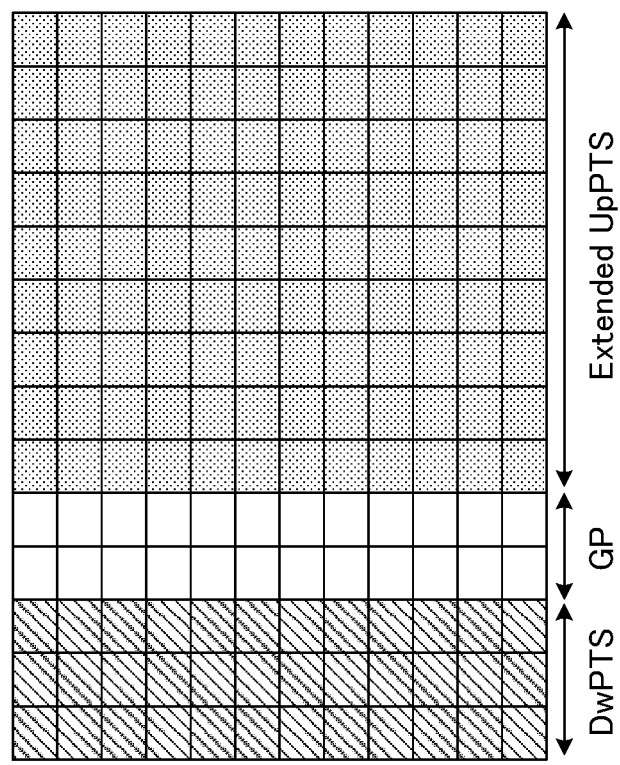
FIG. 6 is a diagram to show examples of a DwPTS, a GP, and an extended UpPTS in a special subframe configuration for use in TDD cells.

So, the present inventors have come up with the idea of extending the uplink time duration (UpPTS) in special subframe configurations so as to make it possible to transmit UL signals other than PRACH signals and SRSs even when the UL/DL configuration 7 of FIG. 3B, which contains a special subframe, is used (see FIG. 6). Now, special subframe configurations to extend the UpPTS will be described below.

FIG. 7 shows a table, in which a special subframe configuration 10 (Sp-SF Config. 10), in which the UpPTS is extended, is newly provided as a special subframe configuration, in addition to existing special subframe configurations 0 to 9. The detail of special subframe configuration 10 to be added anew has only to be that the UpPTS is extended longer than heretofore (the UpPTS is at least three symbols or more). Hereinafter, an UpPTS like this will be referred to as an "extended UpPTS."

FIG. 7 shows a case where, as special subframe configuration 10, the DwPTS is "3," the GP is "2," and the UpPTS is "9." That is, the capacity of UL transmission in special subframes is increased by increasing the number of UpPTS symbols, which has heretofore been 1 or 2, up to 9. Note that the special subframe configuration to introduce anew is not limited to one type. It is equally possible to provide a number of special subframe configurations in which the UpPTS is increased to three symbols or more. Also, although an extended UpPTS has only to be at least three symbols or more, an extended UpPTS is preferably four symbols or more, and, even more preferably, five symbols or more. Also, a structure may also be employed here in which special subframe configuration 10 is newly introduced only when UL/DL configuration 7 is used.

Alternatively, a structure may also be employed here in which a user terminal uses an existing special subframe configuration and changes the special subframe configuration (extends the UpPTS) based on a special subframe configuration change request signal that is reported on the downlink (see FIG. 8).

FIG. 8A shows a case where a user terminal having received a special subframe configuration change request signal changes the length of the GP and the length of the UpPTS. The user terminal uses an existing special subframe configuration, like legacy terminals (Rel. 8-11 UEs) do, unless there is a predetermined command (special subframe configuration change request signal) from a radio base station. Meanwhile, when a special subframe configuration change request signal is received, the user terminal executes control so that the length of the UpPTS is extended to three symbols or more and the number of GP symbols is reduced by the number of UpPTS symbols extended. Note that the special subframe configuration change request signal can be reported from the radio base station to the user terminal by using a downlink control signal (for example, a UL grant).

Note that the user terminal may execute control so that the number of DwPTS symbols is reduced in accordance with the extension of the UpPTS. FIG. 8B shows a case where a user terminal having received a special subframe configuration change request signal changes the length of the DwPTS and the length of the UpPTS. To be more specific, the user terminal executes control so that the length of the UpPTS is extended to three symbols or more and the number of DwPTS symbols is reduced by the number of UpPTS symbols extended.

In this way, by shortening the DwPTS and/or the GP and extending the UpPTS, it is possible to increase the capacity of UL transmission in special subframes. By this means, even when UL/DL configuration 7 in which no UL subframe is configured is used, it becomes possible to transmit uplink control information (UCI), higher layer control signals and UL data by using special subframes. As a result of this, even if the mode of use of the radio communication system is stand-alone and/or dual connectivity, it is still possible to use UL/DL configuration 7 adequately.

Meanwhile, in TDD, a synchronization signal (PSS) is allocated to the second OFDM symbol in the DwPTS (the third OFDM symbol from the subframe top). Consequently, in special subframes, the DwPTS requires three symbols or more (in other words, cannot be made less than three symbols). Also, in order to provide support for timing-advanced, at least one symbol is required for the GP (see FIG. 9). Taking these into account, it may be possible to extend the UpPTS up to maximum ten OFDM symbols (from the fourth OFDM symbol to the thirteenth OFDM symbol).

Figure 10:
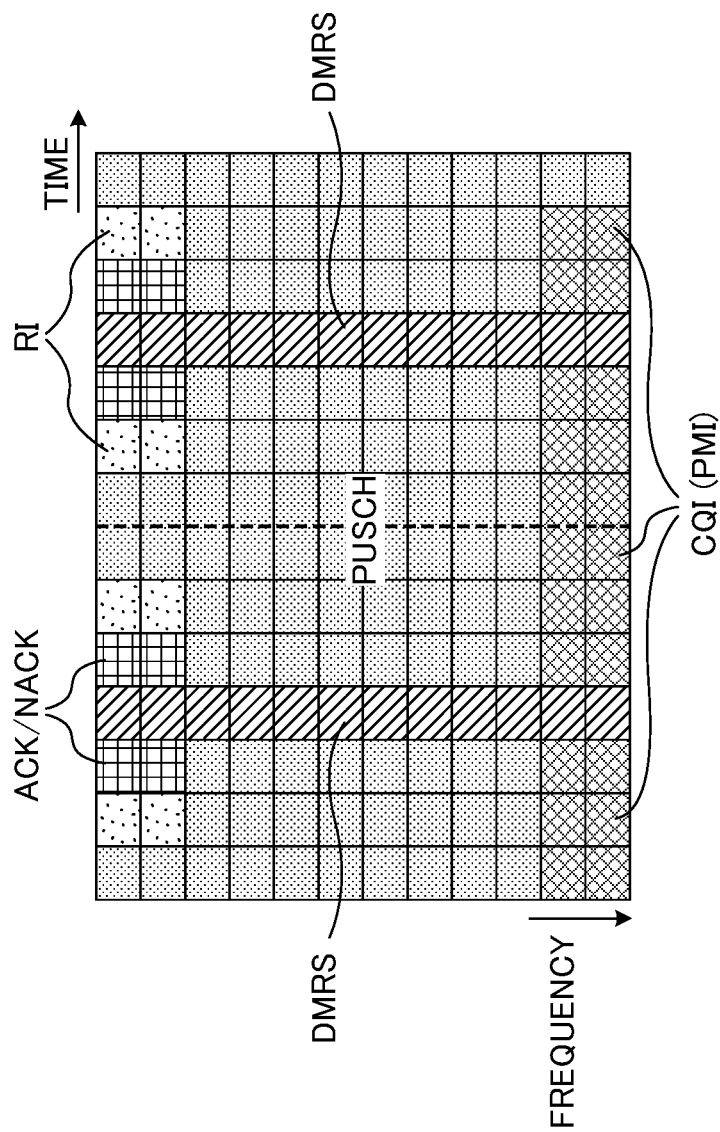
FIG. 10 is a diagram to show an example of a PUSCH format in an existing UP subframe.

That is, even when the UpPTS is extended, at least four OFDM symbols at the subframe top cannot be used for UL communication. In this case, it becomes not possible to multiplex users in the same resource block by using orthogonal spreading code, along the direction of OFDM symbols in subframes, and therefore it becomes difficult to use the physical format of the PUCCH in an extended UpPTS. Consequently, it may be possible to use the physical format of the PUSCH in an extended UpPTS. Here, an example physical format of the PUSCH is shown in FIG. 10.

When uplink control information (UCI) is fed back in a timing to transmit a PUSCH signal, the uplink control information is allocated and transmitted in the PUSCH. In this case, a delivery acknowledgement signal (A/N), a rank indicator (RI) and channel quality information (CQI)/pre-coding matrix indicator (PMI) are multiplexed as shown in FIG. 10. Also, reference signals for demodulating the PUSCH signal (PUSCH DMRSs) are allocated to the fourth symbol from the top of each slot (the third symbol and the tenth symbol).

Consequently, when a PUSCH physical format is applied to a special subframe in which an extended UpPTS is included, at least four top symbols cannot be used for UL communication, and one DMRS cannot be transmitted. Due to this, there is a threat that the accuracy of channel estimation (in particular, robustness against variations over time) might deteriorate. Also, this makes it difficult to apply OCC to DMRSs for MU-MIMO. Furthermore, with the mapping method that is used when uplink control information (UCI) is transmitted using the PUSCH ("UCI on PUSCH") in an existing system, cases might occur where, since no DMRSs are provided, the uplink control information cannot be mapped near DMRSs (nearby resources).

So, the present inventors have come up with the idea of allocating uplink signals by controlling the arrangement of DMRSs (the locations, the number of DMRSs to arrange, etc.) based on the length of the UpPTS that to be extended. Alternatively, assuming cases where signals are transmitted using the PUSCH in an extended UpPTS, the present inventors have come up with the idea of multiplexing and transmitting one or more DMRS and SRS upon the UpPTS.

Now, the radio communication method according to the present embodiment will be described below in detail with reference to the accompanying drawings. Note that, according to the present embodiment, TDD cells to use the UL/DL configuration 7 of FIG. 3B can be used in licensed areas or in unlicensed areas.

First Example

Assuming a case where the uplink time duration (UpPTS) in a special subframe is extended, a method of arranging DMRSs (Demodulation Reference Signals) in this extended UpPTS will be described with a first example.

Figure 11:
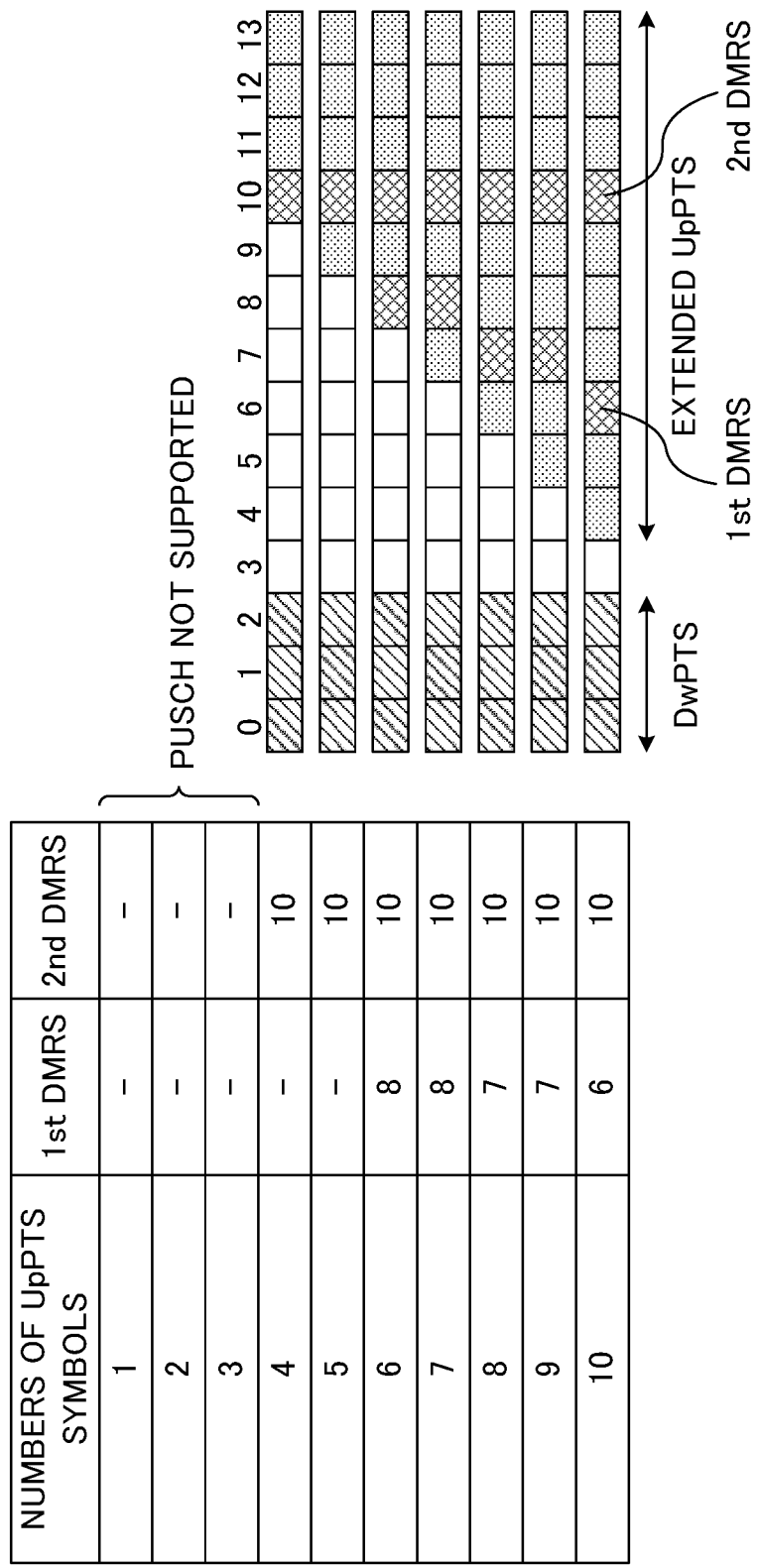
FIG. 11 is a diagram to show the relationship between the number of UpPTS symbols and uplink demodulation reference signals (PUSCH DMRS) placed in the UpPTS.

FIG. 11 shows the number of UpPTS symbols and an arrangement/relationship of uplink demodulation reference signals (PUSCH DMRSs) that are placed in the UpPTS. As shown in FIG. 11, a user terminal changes the arrangement of DMRSs (the locations, the number of DMRSs to arrange, etc.) depending on the length of the UpPTS in a special subframe.

For example, when the number of UpPTS symbols is less than a predetermined value (six in FIG. 11), one DMRS (one symbol) is configured in the UpPTS. On the other hand, when the number of UpPTS symbols is equal to or greater than the predetermined value, two DMRSs (two symbols) are configured in the UpPTS.

When two DMRSs (for example, a first DMRS and a second DMRS) are configured in the UpPTS, the distance between the first DMRS and the second DMRS is controlled depending on the length of UpPTS. In FIG. 11, the distance between the first DMRS and the second DMRS is configured greater as the number of UpPTS symbols grows. Also, when the number of UpPTS symbols is seven or more, it becomes possible to allocate uplink signals to neighboring symbols of the first DMRS and the second DMRS.

In this way, by controlling the arrangement of DMRSs depending on the length of the UpPTS that is extended, the number of symbols to neighbor the symbols where DMRSs are allocated increases, so that it is possible to map uplink control information (UCI), which is important information, to neighboring (for example, front and rear) symbols of the DMRSs.

Also, regardless of the number of UpPTS symbols, it is preferable to configure a DMRS in at least a predetermined symbol (for example, the tenth symbol) on a fixed basis. When a first DMRS and a second DMRS are configured, the location to allocate the first DMRS is changed depending on the length of the UpPTS, while the location to allocate the second DMRS is fixed regardless of the length of the UpPTS.

In this way, by placing at least one DMRS (second DMRS) in the same symbol (for example, the tenth symbol) regardless of the length of the UpPTS, it becomes possible to prevent the second DMRS from interfering with UL data even when the length of the UpPTS is configured differently in nearby cells. Also, when two DMRSs are placed in an extended UpPTS and the length of the extended UpPTS is comparatively long (for example, the UpPTS is six or more), placing PUSCH fields that neighbor the two DMRSs regardless of the length of the extended UpPTS makes it possible to map uplink control information (UCI), which is important information, in front and rear of the two DMRSs.

Note that the method of arranging DMRSs that are configured in an extended UpPTS is by no means limited to the structure shown in above FIG. 11. For example, a structure may be employed in which a DMRS is allocated to the top symbol constituting the UpPTS (see FIG. 12). When two DMRSs (for example, a first DMRS and a second DMRS) are configured in the UpPTS, the first DMRS is allocated to the top symbol constituting the UpPTS, and, regardless of the length of the UpPTS, the second DMRS is allocated to a predetermined symbol (for example, the tenth symbol) on a fixed basis.

Figure 12:
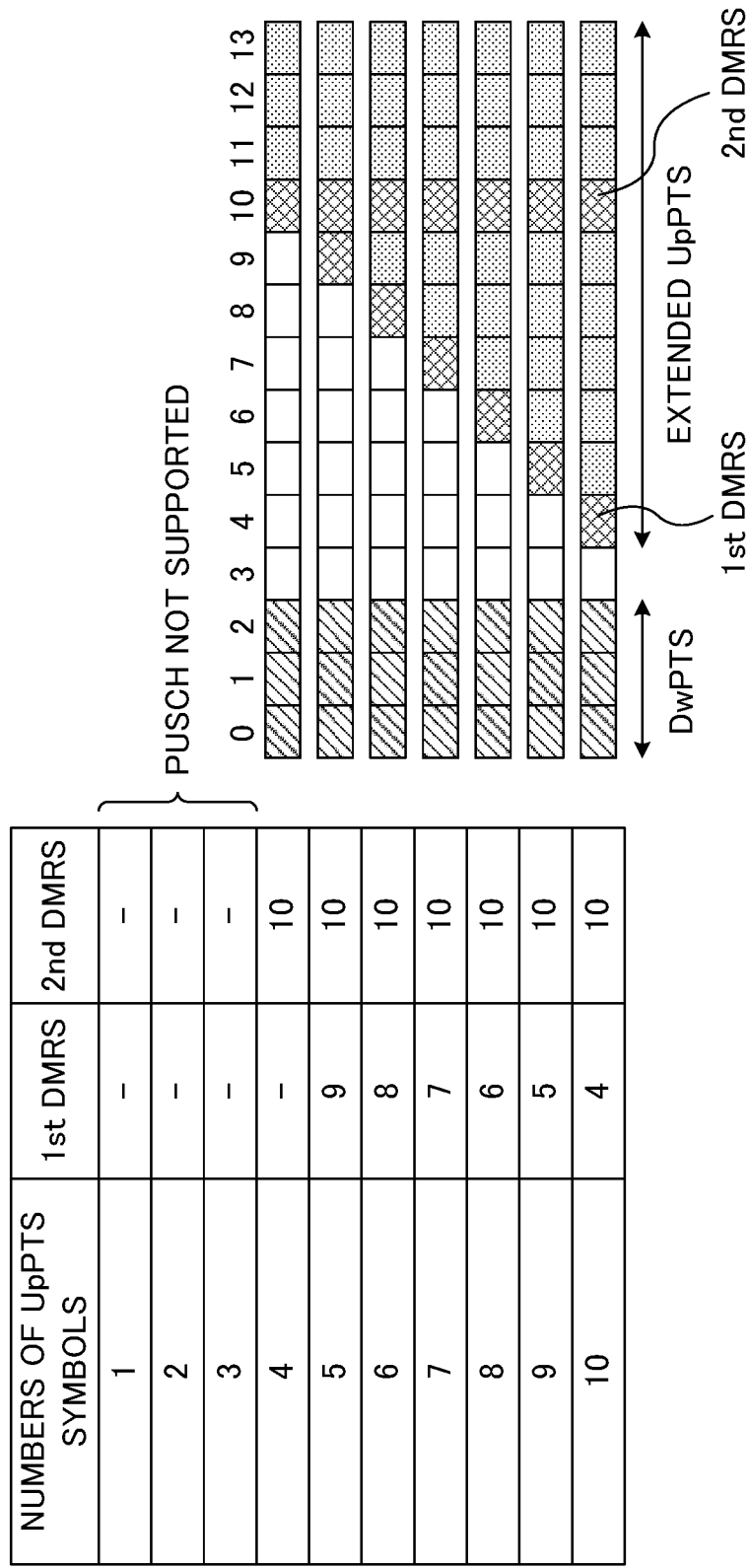
FIG. 12 is a diagram to show the relationship between the number of UpPTS symbols and uplink demodulation reference signals (PUSCH DMRS) placed in the UpPTS.

As shown in FIG. 12, by allocating DMRSs to the top symbol to constitute the UpPTS and a fixed location, it is possible to achieve improved performance of response to variations in time. Also, in the structure shown in FIG. 12, too, it is preferable to map uplink control information (UCI), which is important information, to neighboring (for example, front and rear) symbols of the DMRSs.

In this way, by placing two DMRSs in an extended UpPTS and making the distance between the two DMRSs in time wide, it is possible to effectively improve the performance of response in time and the robustness against variations over time. In this way, by placing at least one DMRS (second DMRS) in the same symbol (for example, the tenth symbol) regardless of the length of the UpPTS, it becomes possible to prevent UL data from interfering with the second DMRS even when the length of the UpPTS is configured differently in nearby cells.

Second Example

Assuming a case where the uplink time duration (UpPTS) in a special subframe is extended, a PUSCH format in which a DMRS (Demodulation Reference Signal) and an SRS (Sounding Reference Signal) are multiplexed over the extended UpPTS will be described with a second example.

Figure 13:
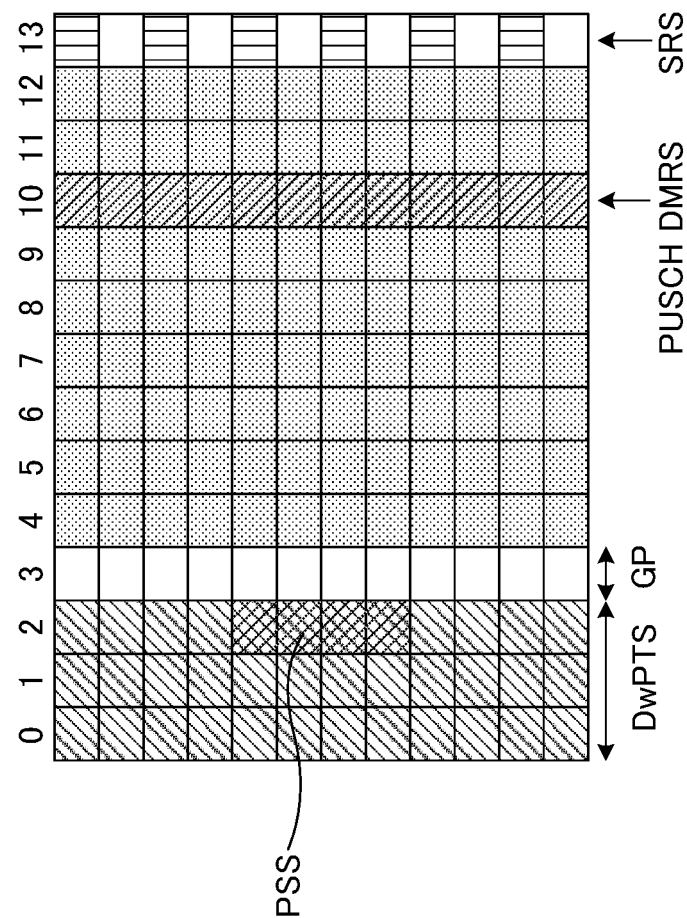
FIG. 13 is a diagram to show a case where DMRS and SRS are multiplexed over an extended UpPTS.

FIG. 13 shows an example PUSCH format in which a DMRS and an SRS are placed in an extended UpPTS. Although a case will be described here in which one DMRS and one SRS (one symbol each) are configured in the UpPTS, the present embodiment is by no means limited to this.

In an extended UpPTS, a user terminal transmits an SRS in a bandwidth including at least the bandwidth allocated to the PUSCH. By multiplexing and transmitting an SRS in the UpPTS, even when only one DMRS (one symbol) is configured in the UpPTS, channel estimation can be executed using the SRS in addition to the DMRS, so that it is possible to prevent the accuracy of channel estimation from deteriorating.

Also, the user terminal may transmit SRSs periodically (periodic-SRSs), or transmit SRSs aperiodically (aperiodic-SRSs) in response to commands from radio base stations. When a radio base station triggers SRSs aperiodically (that is, provides aperiodic-SRS triggers), the radio base station may command SRS sequences and Comb to the user terminal by using the trigger information.

Also, the user terminal may multiplex and transmit an SRS in the UpPTS of every special subframe, or may multiplex and transmit SRSs at a rate of once in every several UpPTSs. Although FIG. 13 shows a case where SRSs are multiplexed in every other OFDM symbol (in even-numbered or in odd-numbered OFDM symbols), it is equally possible to multiplex SRS across a plurality of OFDM symbols.

Also, when the user terminal multiplexes an SRS in the UpPTS, the user terminal may as well multiplex uplink control information upon neighboring symbols of the SRS. In the case illustrated in FIG. 13, it is preferable that the user terminal multiplex uplink control information on the symbol that is one symbol before the SRS (the twelfth OFDM symbol). By multiplexing uplink control information in SRS-neighboring symbols, it becomes possible to prevent the accuracy of channel estimation from deteriorating due to the variations of channels over time, and achieve improved performance.

Also, it is preferable that the user terminal, in the UpPTS, configure a DMRS in a predetermined symbol (for example, the tenth symbol) regardless of the number of UpPTS symbols. By this means, even when the length of the UpPTS is configured differently in nearby cells, it is possible to prevent the DMRS from interfering with UL data.

In this way, when uplink signals are transmitted by extending the UpPTS in a special subframe, employing a PUSCH format in which a DMRS and an SRS are multiplexed in the UpPTS makes it possible to prevent the increase of overhead of due to DMRSs inserted, and, furthermore, improve the accuracy of channel estimation.

Third Example

Timing control for operations pertaining to uplink signals to transmit using special subframes in which the length of the UpPTS is extended will be described with a third example.

In existing LTE, the transmission of PUCCH signals and PUSCH signals using special subframes is not supported, and only the transmission (DL allocation) of PDCCH signals and PDSCH signals is supported in special subframes. Consequently, user terminals operate on the assumption that special subframes are DL subframes. That is, existing LTE stipulates no timing control for operations pertaining to uplink signals that are transmitted in special subframes (for example, DL HARQ feedback, PUSCH transmission in response to a UL grant, PHICH reception (UL HARQ) in response to the PUSCH and so on).

When the timings of operations pertaining to uplink signals to transmit in special subframes are not configured properly, dynamic scheduling and/or HARQ cannot be applied to special subframes, which makes adequate execution of uplink communication difficult.

Figure 14:
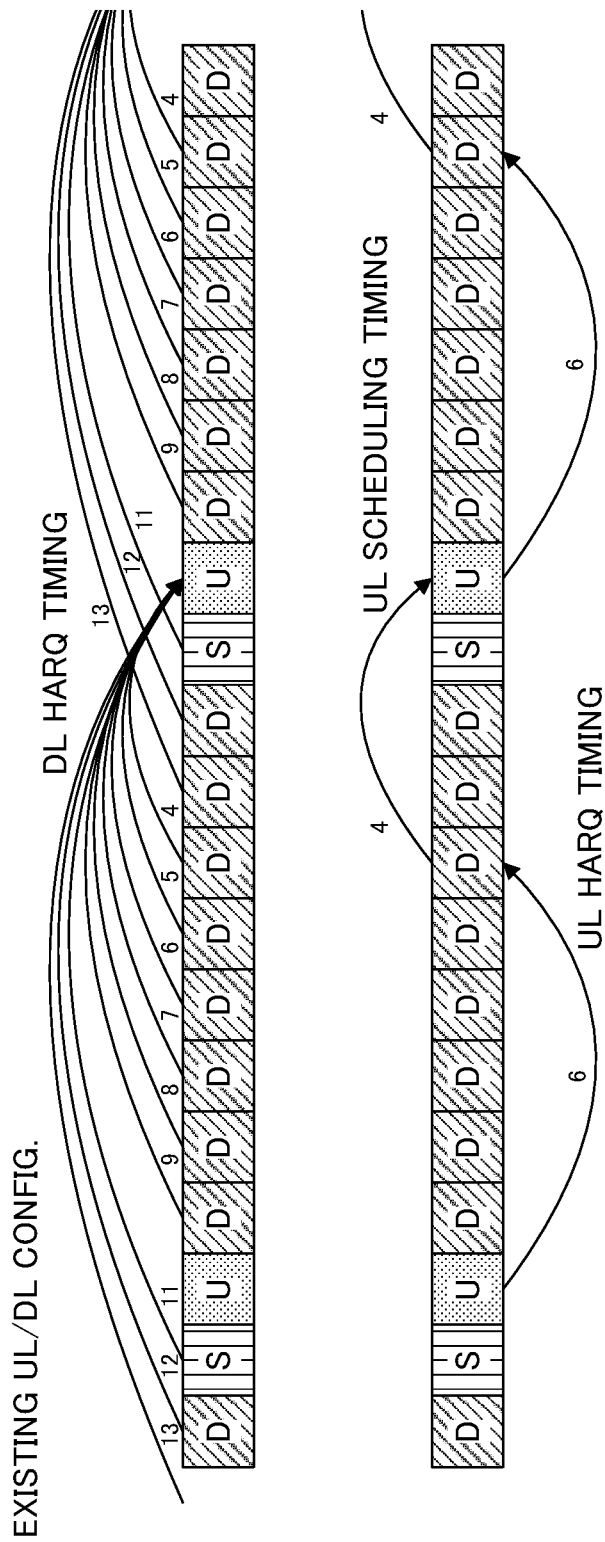
FIG. 14 is a diagram to show examples of operation timing control pertaining to uplink signals to transmit in UL subframes of existing UL/DL configuration 5.

The present inventors have focused on the fact that, assuming that existing special subframes are DL subframes, the UL/DL ratio in existing UL/DL configuration 5 is DL:UL=9:1 (see FIG. 14). FIG. 14 shows the timings of operations pertaining to uplink signals to transmit in UL subframes of existing UL/DL configuration 5 (for example, DL HARQ feedback, PUSCH transmission in response to a UL grant, PHICH reception (UL HARQ) in response to the PUSCH and so on).

Furthermore, the present inventors have focused on the fact that special subframes in which the length of the UpPTS is extended can be used as UL subframes. In this case, the UL/DL ratio in special subframe configurations including an extended UpPTS can be seen as DL:UL=9:1. So, the present inventors have come up with the idea of using the mechanism of existing UL/DL configuration 5 when transmitting uplink signals by using special subframes in which the length of the UpPTS is extended.

Figure 15:
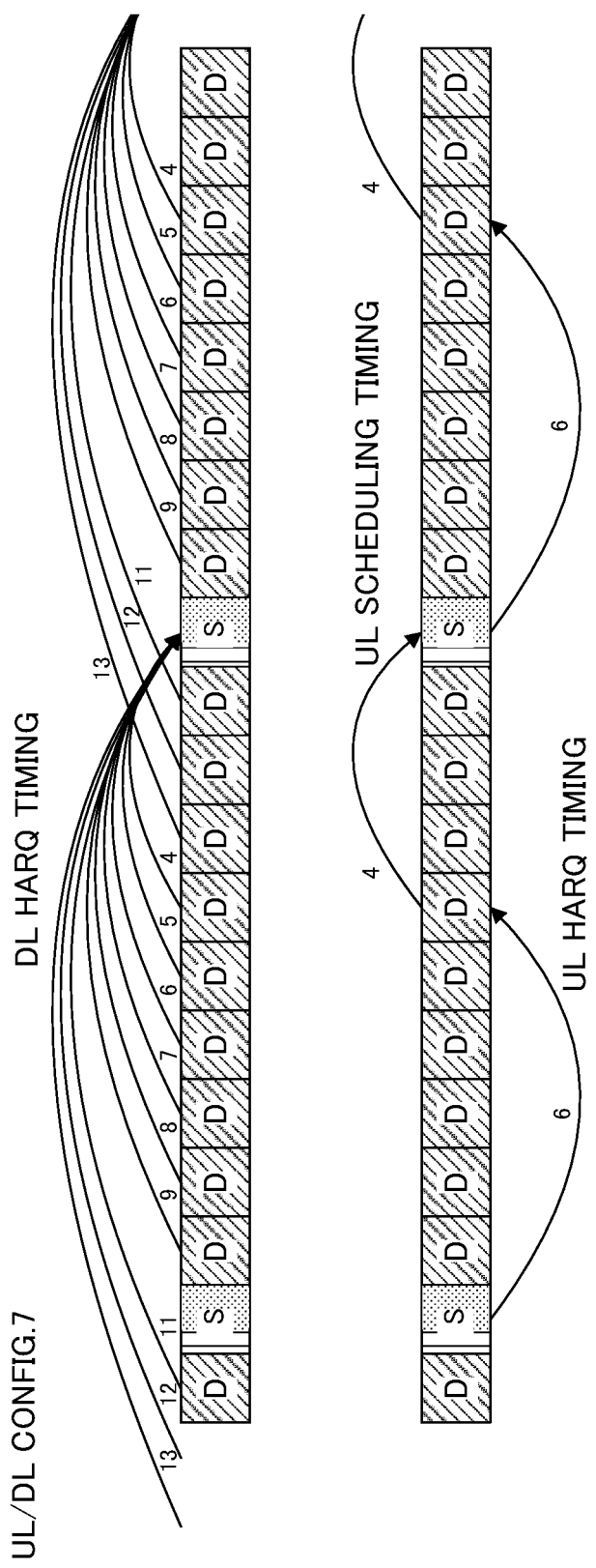
FIG. 15 is a diagram to show examples of operation timing control pertaining to uplink signals to transmit in special subframes of a new UL/DL configuration 7.

FIG. 15 shows timing control for operations pertaining to uplink signals to transmit in special subframes (UL subframes) of UL/DL configuration 7 according to the present embodiment (for example, DL HARQ feedback, PUSCH transmission in response to a UL grant, PHICH reception (UL HARQ) in response to the PUSCH and so on). In FIG. 15, the same mechanism as the DL/UL HARQ timing and the UL scheduling timing of existing UL/DL configuration 5 is used. Note that, in FIG. 15, compared to existing UL/DL configuration 5, the subframes numbers corresponding to respective operation timings are all shifted by −1.

In this way, according to the present embodiment, when UL/DL configuration 7 is employed, the timings of operations pertaining to uplink signals to transmit in special subframes in which the length of the UpPTS is extended are controlled by using the mechanism of existing UL/DL configuration 5. By this means, it is only necessary to apply a predetermined offset to the HARQ timing and the UL scheduling timing stipulated in Rel. 8 (that is, apply a shift of −1 to subframes), so that new UL/DL configuration 7 can be applied to existing user terminals easily.

(Structure of Radio Communication System)

Now, an example of a radio communication system according to the present embodiment will be described in detail below.

Figure 16:
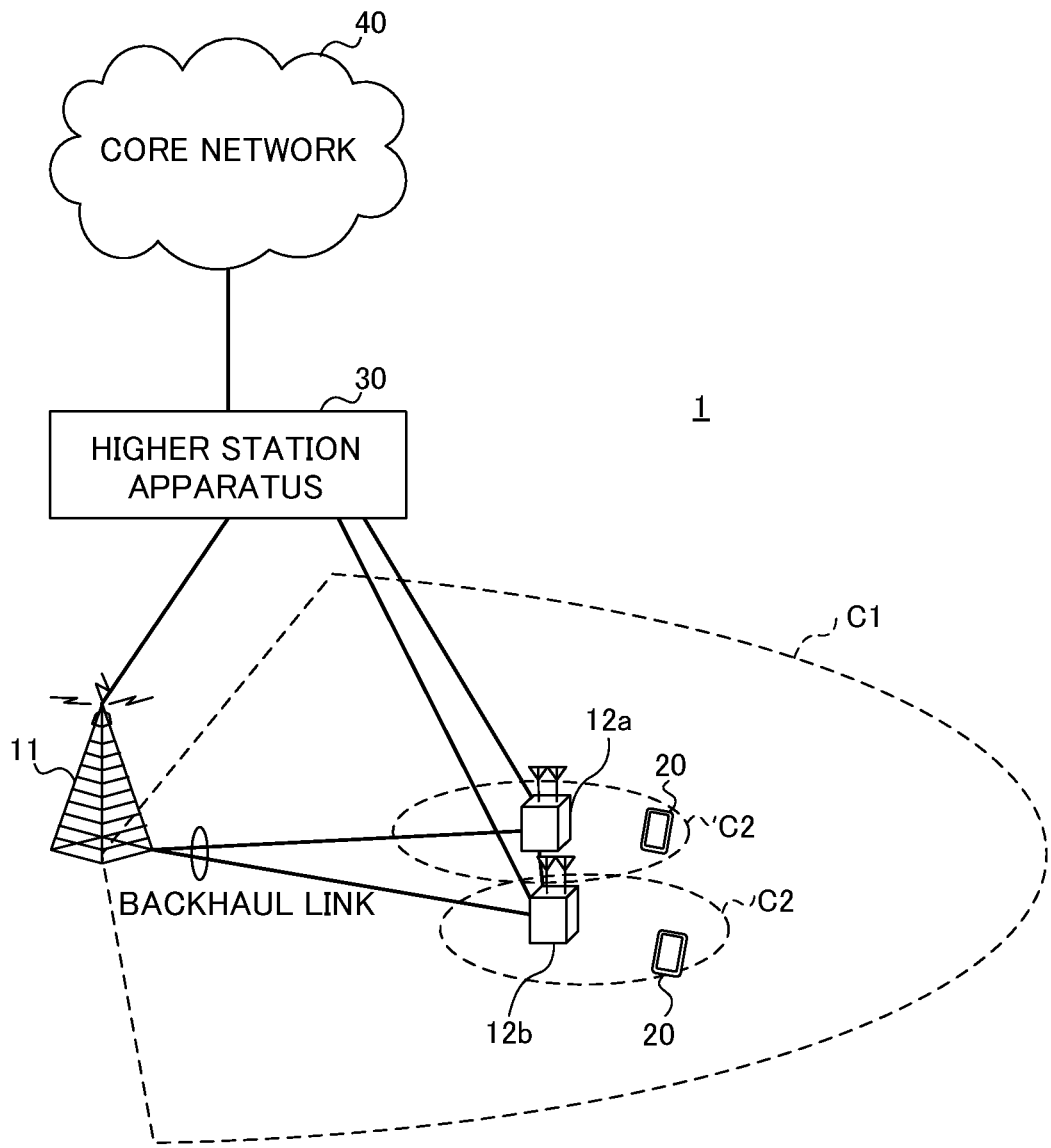
FIG. 16 is a schematic diagram to show an example of a radio communication system according to the present embodiment.

FIG. 16 is a diagram to show a schematic structure of a radio communication system according to the present embodiment. Note that the radio communication system shown in FIG. 16 is, for example, an LTE system or a system to incorporate SUPER 3G. This radio communication system can adopt carrier aggregation (CA) to group a plurality of fundamental frequency blocks (component carriers) into one, where the LTE system bandwidth constitutes one unit. Also, this radio communication system may be referred to as "IMT-advanced," or may be referred to as "4G," "FRA (Future Radio Access)," etc.

The radio communication system 1 shown in FIG. 16 includes a radio base station 11 that forms a macro cell C1, and radio base stations 12a and 12b that form small cells C2, which are placed within the macro cell C1 and which are narrower than the macro cell C1. Also, user terminals 20 are placed in the macro cell C1 and in each small cell C2. The user terminals 20 can connect with both the radio base station 11 and the radio base stations 12. Also, intra-base station CA (intra-eNB CA) or inter-base station CA (inter-eNB CA) is applied between the radio base station 11 and the radio base stations 12. Also, for CA between the radio base station 11 and the radio base stations 12, TDD-TDD CA or TDD-FDD CA and so on can be applied.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, the X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. Hereinafter the radio base stations 11 and 12 will be collectively referred to as a "radio base station 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands.

Now, communication channels used in the radio communication system shown in FIG. 16 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Scheduling information for the PDSCH and the PUSCH and so on are communicated by the PDCCH (Physical Downlink Control CHannel). The number of OFDM symbols to use for the PDCCH is communicated by the PCFICH (Physical Control Format Indicator CHannel). HARQ ACKs/NACKs for the PUSCH are communicated by the PHICH (Physical Hybrid-ARQ Indicator CHannel). Also, the scheduling information for the PDSCH and the PUSCH and so on may be communicated by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are communicated by this PUSCH. Also, downlink radio quality information (CQI: Channel Quality Indicator), ACKs/NACKs and so on are communicated by the PUCCH, the PUSCH and so on (transmitted simultaneously with user data).

Figure 17:
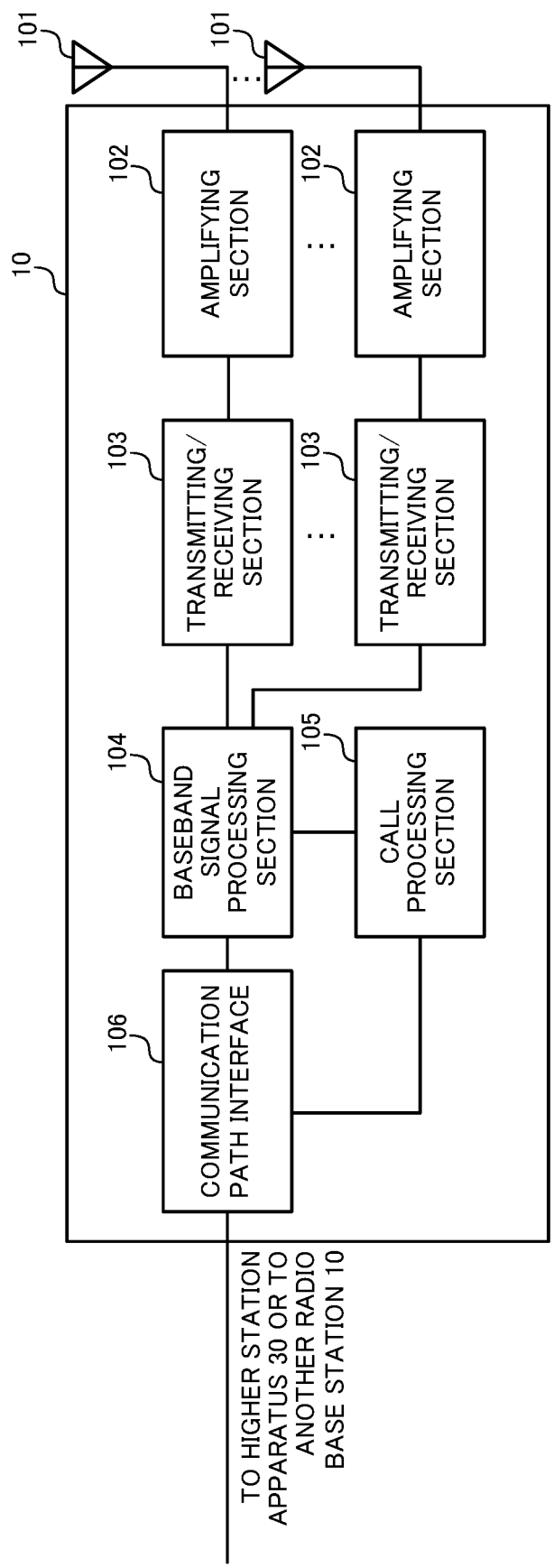
FIG. 17 is a diagram to explain an overall structure of a radio base station according to the present embodiment.

FIG. 17 is a diagram to show an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and forwarded to each transmitting/receiving section 103.

Also, the baseband signal processing section 104 reports, to the user terminal 20, control information for allowing communication in the cell, through higher layer signaling (RRC signaling, broadcast signal and so on). The information for allowing communication in the cell may include, for example, information about the UL/DL configuration to use in TDD cells, information about special subframes, the uplink or downlink system bandwidth, feedback resource information, and so on. The information about special subframes may include the special subframe configuration to use, a special subframe configuration change command, the details of change when change is made to special subframes (information about the extension of the UpPTS), and so on.

Also, the baseband signal processing section 104 controls arrangement of uplink demodulation reference signals (DMRSs) (the locations, the number of DMRSs, etc.) depending on the configuration of special subframes (the length of the extended UpPTS), and, furthermore, controls the allocation of uplink signals (user data, uplink control information, etc.) and SRSs.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

The transmitting/receiving sections 103 function as transmission sections that transmit information about the UL/DL configuration to use in TDD cells, information about special subframes and so on, through higher layer signaling (broadcast signals, RRC signaling and so on). Also, when the arrangement of DMRSs is controlled to change in accordance with the extension of the UpPTS, the transmitting/receiving sections 103 can report information about the arrangement of DMRSs to the user terminal by using downlink signals (downlink control information, broadcast signal, RRC signaling or combination of these). Note that, if the arrangement of DMRSs is determined in advance for every length of the UpPTS (for example, when the number of UpPTS symbols and the arrangement of DMRSs are associated with each other), it is possible to skip reporting information about the arrangement of DMRSs.

As for data to be transmitted from the user terminals 20 to the radio base station 10 on the uplink, radio frequency signals that are received in the transmitting/receiving antennas 101 are each amplified in the amplifying sections 102, converted into the baseband signal through frequency conversion in each transmitting/receiving section 103, and input in the baseband signal processing section 104.

In the baseband signal processing section 104, the user data that is included in the input baseband signal is subjected to an FFT process, an IDFT process, error correction decoding, a MAC retransmission control receiving process, and RLC layer and PDCP layer receiving processes, and the result is forwarded to the higher station apparatus 30 via the communication path interface 106. The call processing section 105 performs call processing such as setting up and releasing communication channels, manages the state of the radio base stations 10 and manages the radio resources.

Figure 18:
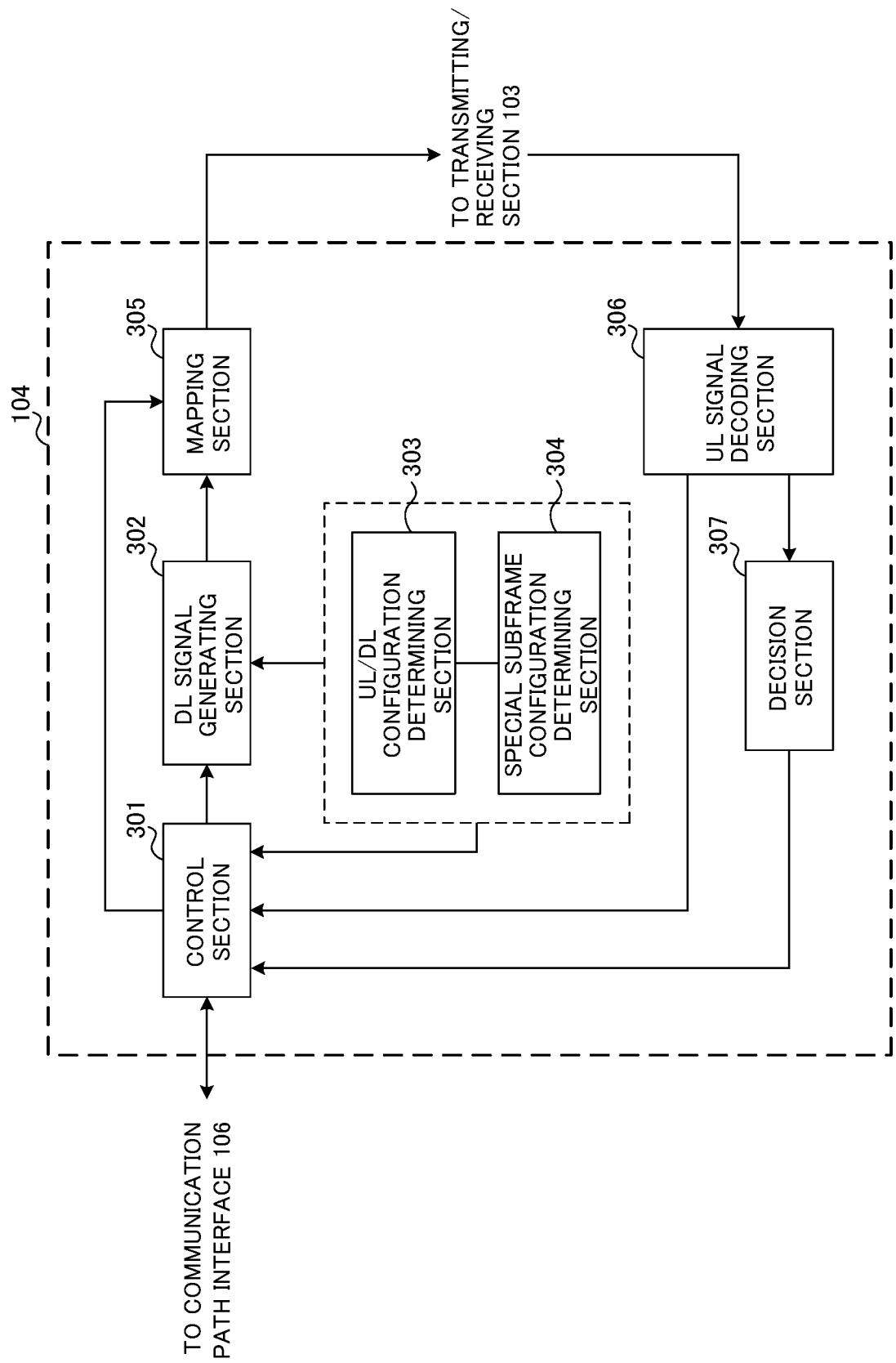
FIG. 18 is a diagram to explain a functional structure of a radio base station according to the present embodiment.

FIG. 18 is a diagram to show a principle functional structure of the baseband signal processing section 104 provided in the radio base station 10 according to the present embodiment As shown in FIG. 18, the baseband signal processing section 104 provided in the radio base station 10 is comprised at least of a control section 301, a DL signal generating section 302, a UL/DL configuration determining section 303, a special subframe configuration determining section 304, a mapping section 305, a UL signal decoding section 306 and a decision section 307.

The control section 301 controls the scheduling of downlink user data that is transmitted in the PDSCH, downlink control information that is transmitted in the PDCCH and/or the enhanced PDCCH (EPDCCH), downlink reference signals and so on. Also, the control section 301 can control the scheduling of uplink user data that is transmitted in the PUSCH, uplink control information that is transmitted in the PUCCH or the PUSCH, and uplink reference signals (DMRS, SRS, etc.) (allocation control). Information about the allocation control of uplink signals (uplink control signals and uplink user data) is reported to user terminals by using downlink control signals (DCI).

To be more specific, the control section 301 controls the allocation of radio resources to downlink signals and uplink signals based on command information from the higher station apparatus 30, feedback information from each user terminal 20 and so on. That is, the control section 301 functions as a scheduler. Also, when the radio base station 10 uses TDD, the allocation of downlink signals and uplink signals to each subframe is controlled based on the UL/DL configuration to use and/or the special subframe configuration.

When UL/DL configuration 7 to include special subframes with an extended UpPTS is used, the control section 301 controls the uplink signals to allocate to the extended UpPTS of the special subframes. For example, the control section 301 controls the allocation of uplink signals such as PRACH signals, message 3 in random access procedures, higher layer control signals, downlink HARQ-ACK, CQI, SR, SRS and so on, by using the extended UpPTS of special subframes.

Furthermore, the control section 301 can control the allocation of uplink control information by taking into account the DMRSs that are configured depending on the number of extended UpPTS symbols. For example, the control section 301 may allocate uplink control information to an OFDM symbol to neighbor a DMRS placed in an extended UpPTS. As shown in above FIG. 11, when two DMRSs are placed in an extended UpPTS, uplink control information (UCI) can be controlled to be allocated in front and rear of the two DMRSs.

The DL signal generating section 302 generates downlink control signals (PDCCH signals and/or EPDCCH signals) and downlink data signals (PDSCH signals) that are determined to be allocated by the control section 301. To be more specific, based on commands from the control section 301, the DL signal generating section 302 generates DL assignments, which report downlink signal allocation information, and UL grants, which report uplink signal allocation information.

Also, the DL signal generating section 302 generates information about the UL/DL configuration determined in the UL/DL configuration determining section 303, information about the special subframe configuration determined in the special subframe configuration determining section 304. When the DL signal generating section 302 commands the user terminal to make a change to special subframes (see above FIG. 8), the DL signal generating section generates a special subframe change request signal as a UL grant.

The UL/DL configuration determining section 303 determines the UL/DL configuration to use in TDD taking into account UL and DL traffic and so on. The UL/DL configuration determining section 303 can select a predetermined UL/DL configuration from a plurality of UL/DL configurations including UL/DL configurations for DL communication (such as above-described UL/DL configuration 7) (see FIG. 3B and so on). Note that the UL/DL configuration determining section 303 can determine the UL/DL configuration based on information from the higher station apparatus 30 and so on.

The special subframe configuration determining section 304 determines the special subframe configuration. Note that the special subframe configuration determining section 304 can determine the UL/DL configuration based on information from the higher station apparatus 30 and so on. The special subframe configuration determining section 304 can determine a predetermined special subframe configuration from a table, in which a special subframe configuration 10 to use an extended UpPTS is newly provided, in addition to existing special subframe configurations 0 to 9 (see above FIG. 7).

For example, the special subframe configuration determining section 304 extends the length of the UpPTS to three symbols or more, and, furthermore, lowers the number of GP symbols by the number of UpPTS symbols extended (see FIG. 8A). Alternatively, the special subframe configuration determining section 304 may as well extend the length of the UpPTS to three symbols or more, and, furthermore, lowers the number of DwPTS symbols by the number of UpPTS symbols extended (see FIG. 8B).

The mapping section 305 controls the allocation of the downlink control signals and the downlink data signals generate in the DL signal generating section 302 to radio resources based on commands from the control section 301.

The UL signal decoding section 306 decodes the feedback signals (delivery acknowledgement signals and so on) transmitted from the user terminal, and outputs the results to the control section 301. Also, the UL signal decoding section 306 decodes the uplink data signals transmitted from the user terminal through an uplink shared channel (PUSCH), and outputs the results to the decision section 307. The decision section 307 makes retransmission control decisions (ACKs/NACKs) based on the decoding results in the UL signal decoding section 306, and, furthermore, outputs the results to the control section 301.

Figure 19:
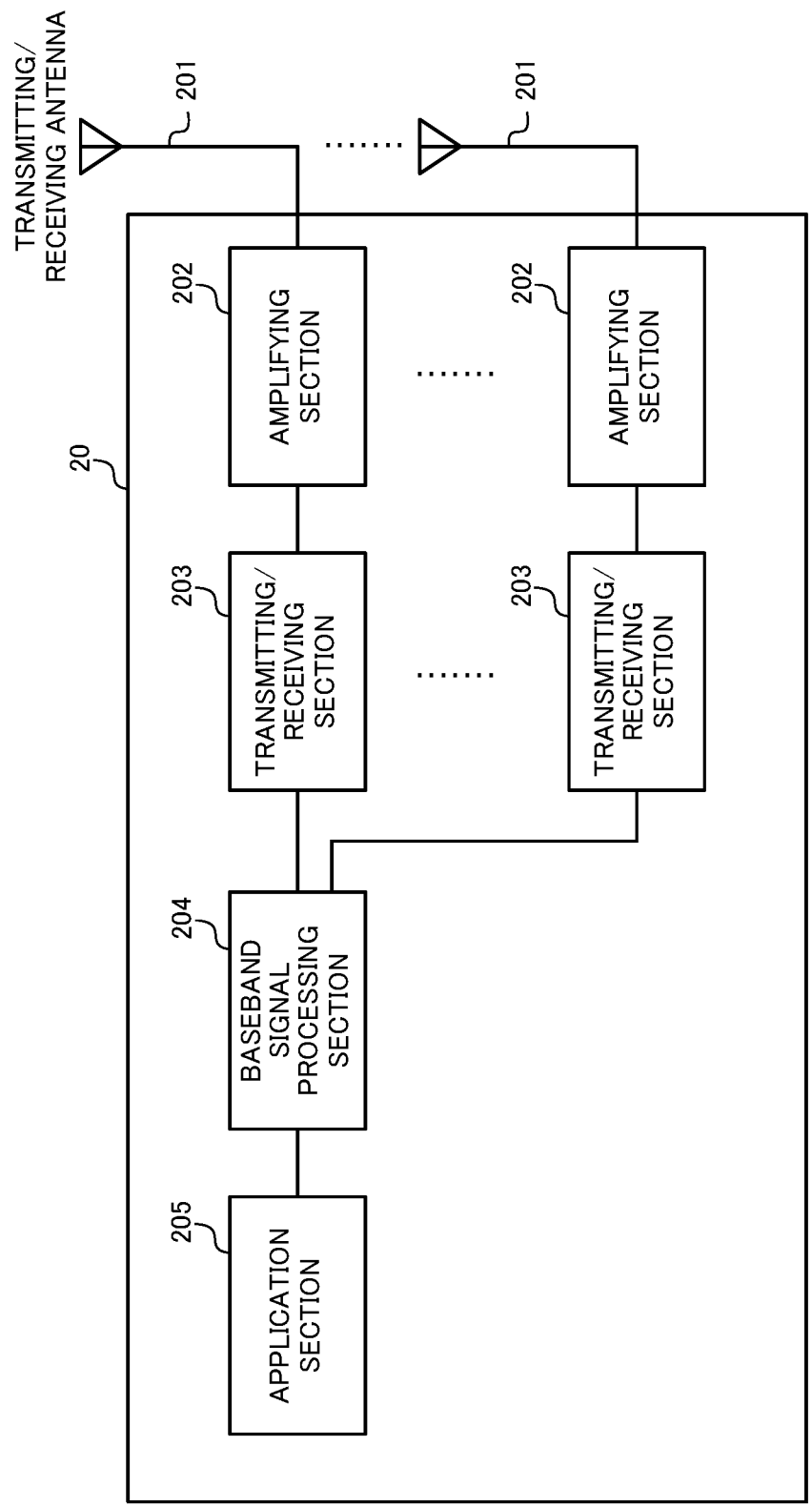
FIG. 19 is a diagram to explain an overall structure of a user terminal according to the present embodiment.

FIG. 19 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control, in the baseband signal processing section 204. In this downlink data, downlink user data is forwarded to the application section 205. The application section 205 performs processes related to higher layers above the physical layer and the MAC layer. Also, in the downlink data, broadcast information is also forwarded to the application section 205.

When the user terminal 20 connects with a TDD cell, the transmitting/receiving sections 203 function as receiving sections to receive information about the UL/DL configuration, information about special subframes, and so on. The information about special subframes may include the special subframe configuration to employ, a special subframe configuration change command, the details of change when change is made to special subframes (information about the extension of the UpPTS) and so on.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 20:
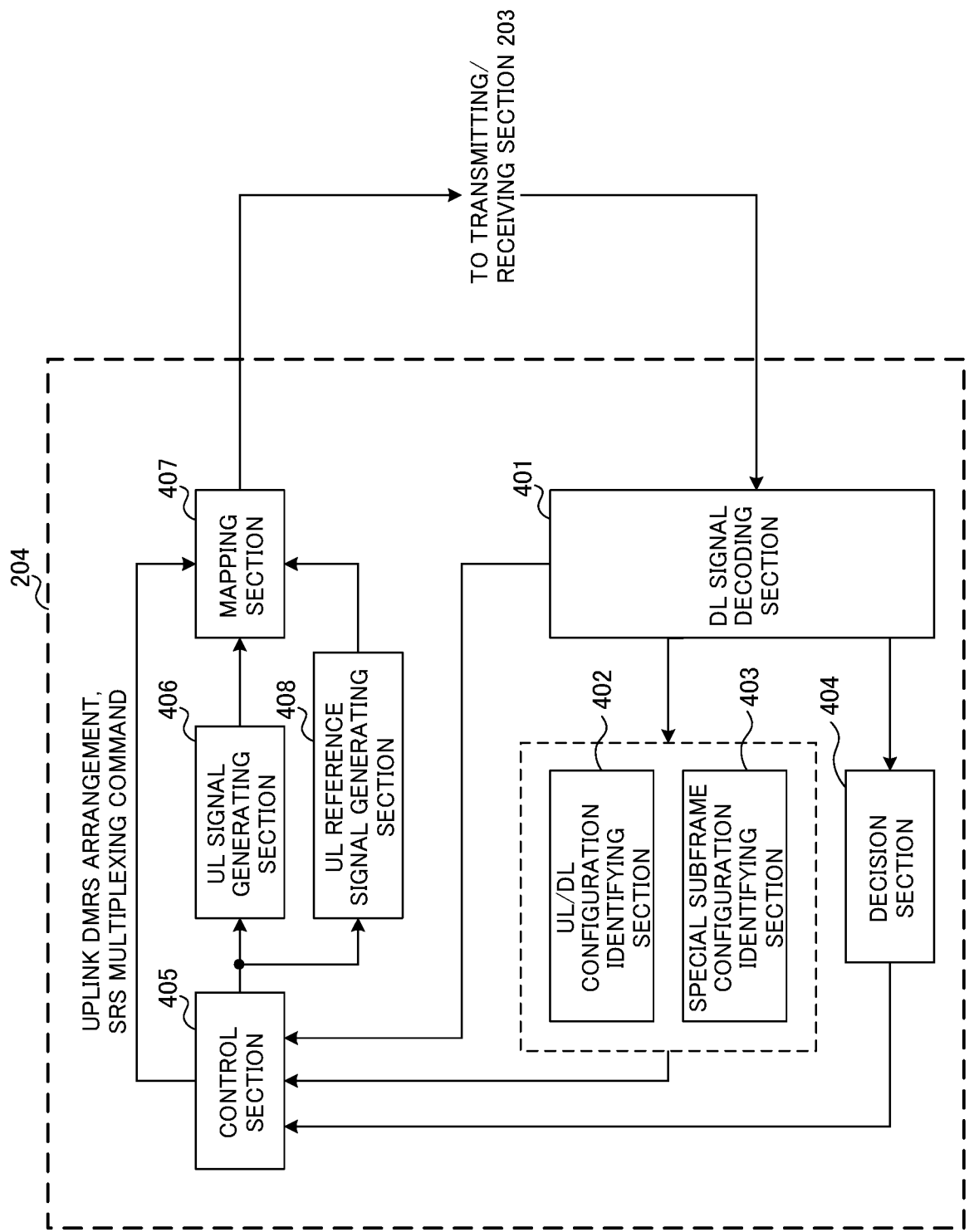
FIG. 20 is a diagram to explain a functional structure of a user terminal according to the present embodiment.

FIG. 20 is a diagram to show a principle functional structure of the baseband signal processing section 204 provided in the user terminal 20. As shown in FIG. 20, the baseband signal processing section 204 provided in the user terminal 20 is comprised at least of a DL signal decoding section 401, a UL/DL configuration identifying section 402, a special subframe configuration identifying section 403, a decision section 404, a control section 405, a UL signal generating section 406, a mapping section 407 and a UL reference signal generating section 408.

The DL signal decoding section 401 decodes the downlink control signals (PDCCH signals) transmitted in the downlink control channel (PDCCH), and outputs scheduling information (information regarding the allocation to uplink resources) to the control section 405. Also, the DL signal decoding section 401 decodes the downlink data signals transmitted in the downlink shared channel (PDSCH), and outputs the results to the decision section 404. The decision section 404 makes retransmission control decisions (ACKs/NACKs) based on the decoding results in the DL signal decoding section 401, and, furthermore, outputs the results to the control section 405.

If information about the UL/DL configuration or information about special subframes is included in a downlink signal that is received, the DL signal decoding section 401 outputs the decoded information to the UL/DL configuration identifying section 402 and the special subframe configuration identifying section 403.

The UL/DL configuration identifying section 402 identifies the UL/DL configuration which the user terminal employs, based on the information about the UL/DL configuration reported from the radio base station. Also, the UL/DL configuration identifying section 402 outputs the information about the UL/DL configuration to employ, to the control section 405 and/or others.

The special subframe configuration identifying section 403 identifies the special subframe configuration the user terminal employs, based on the information about the special subframe configuration reported from the radio base station. Also, the special subframe configuration identifying section 403 outputs the information about the UL/DL configuration to employ, to the control section 405 and/or others. Note that information about the DMRS placed in the UpPTS may be included in the information about the special subframe configuration.

As shown in above FIG. 7, when a table providing a special subframe configuration to use an extended UpPTS is used, the special subframe configuration identifying section 403 can specify the special subframe configuration based on broadcast information or based on information that is reported through RRC signaling and/or the like. For example, when the special subframe configuration identifying section 403 decides to employ special subframe configuration 10 of above FIG. 7, the subframe configuration identifying section 403 sends an output to that effect to the control section 405.

Also, as shown in above FIG. 8, when the length of the UpPTS is changed based on commands from radio base stations, the special subframe configuration identifying section 403 identifies the special subframe configuration to employ based on information contained in a downlink signal (for example, a UL grant) and outputs the result to the control section 405.

The control section 405 controls the generation of uplink control signals (feedback signals), uplink data signals and uplink reference signals based on downlink control signals (PDCCH signals) transmitted from radio base stations, retransmission control decisions in response to PDSCH signals received and so on. The downlink control signals are output from the DL signal decoding section 401, and the retransmission control decisions are output from the decision section 404.

Also, the control section 405 controls the transmission of the uplink control signals, uplink data signals and uplink reference signals based on the information about the UL/DL configuration output from the UL/DL configuration identifying section 402, the information about special subframes output from the special subframe configuration identifying section 403 and so on. For example, the control section 405 extends the UpPTS to constitute special subframes longer than an existing UpPTS based on the information about special subframes, and controls the allocation of uplink signals.

When the UpPTS is extended, the control section 405 can control the arrangement of uplink DMRSs (the locations, the number of DMRSs to arrange, etc.) based on the length of the UpPTS. For example, when the number of UpPTS symbols is equal to or greater than a predetermined value, the control section 405 configures two uplink DMRSs (two symbols). As shown in FIG. 11, the control section 405 configures two DMRSs when the number of UpPTS symbols is six or more, and configures one DMRS when the number of UpPTS symbols is five or less. Also, as shown in above FIG. 12, the control section 405 configures two DMRSs when the number of UpPTS symbols is five or more, and configures one DMRS when the number of UpPTS symbols is four or less.

Furthermore, the control section 405 can arrange two DMRSs a greater distance apart when the number of UpPTS symbols increases. Also, the control section 405 can change the location to allocate the first DMRS depending on the length of the UpPTS, and configure the location to allocate the second DMRS (for example, the tenth OFDM symbol) on a fixed basis regardless of the length of the UpPTS.

The control section 405 also functions as a feedback control section to control the feedback of channel state information (CSI), delivery acknowledgement signals (A/N's) and so on. In this case, the control section 405 can control the allocation of uplink control information (CSI such as CQI, PMI, RI and so on, A/N's, etc.) taking into account the DMRS to be configured based on the number of extended UpPTS symbols. For example, the control section 405 executes control so that uplink control information in allocated to an OFDM symbol that neighbors a DMRS that is placed in an extended UpPTS.

Also, the control section 405 can control the allocation of DMRSs and channel quality measurement reference signals (SRSs) to an extended UpPTS (see above FIG. 13).

The UL signal generating section 406 generates uplink control signals (feedback signals such as delivery acknowledgement signals, channel state information (CSI) and so on) based on commands from the control section 405. Also, the UL signal generating section 406 generates uplink data signals (user data) based on commands from the control section 405. Also, the UL reference signal generating section 408 controls the generation of reference signals (DMRSs, SRSs, etc.) to transmit on the uplink.

The mapping section 407 (allocation section) controls the allocation of uplink control signals, uplink data signals and uplink reference signals to radio resources based on commands from the control section 405. For example, as shown in above FIG. 11 to FIG. 13, the mapping section 407 maps the uplink control signals, uplink data signals and uplink reference signals to an extended UpPTS based on commands from the control section 405.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is only provided for the purpose of illustrating examples, and should by no means be construed to limit the present invention in any way.

The invention claimed is:

1. A terminal comprising:
a processor that controls a mapping of a first demodulation reference signal (DMRS), having a fixed location regardless of a symbol duration of an uplink shared channel (PUSCH), controls a mapping of a second DMRS, which is allocated depending on the symbol duration of the PUSCH, and determines a location of the second DMRS if the second DMRS is allocated; and
a transmitter that transmits at least one of the first DMRS and the second DMRS when a number of symbols of the PUSCH is greater or equal to 4 and does not transmit either the first DMRS or the second DMRS when the number of symbols of the PUSCH is less than 4,
wherein the processor controls the mapping of the first DMRS and the second DMRS using a correspondence relationship between the symbol duration of the PUSCH and a DMRS position information,
wherein the correspondence relationship is based on a number of symbols of the DMRS, and
wherein the greater the symbol duration of the PUSCH, the greater an allocation space between the first DMRS and the second DMRS.

2. The terminal according to claim 1, wherein
if the symbol duration of the PUSCH is greater than, or equal to, a predetermined value, then the processor controls the mapping of the first DMRS and the second DMRS, and
if the symbol duration of the PUSCH is less than the predetermined value, then the processor controls the mapping of the first DMRS without controlling the mapping of the second DMRS.

3. A terminal comprising:
a processor that controls a mapping of a plurality of demodulation reference signals (DMRSs) if a symbol duration of an uplink shared channel (PUSCH) is greater than, or equal to, a predetermined value, and controls a mapping of one DMRS if the symbol duration of the PUSCH is less than the predetermined value; and
a transmitter that transmits the plurality of DMRSs or the one DMRS when a number of symbols of the PUSCH is greater or equal to 4 and does not transmit either the plurality of DMRSs or the one DMRS when the number of symbols of the PUSCH is less than 4,
wherein the processor controls the mapping of the plurality of DMRSs and the one DMRS using a correspondence relationship between the symbol duration of the PUSCH and a DMRS position information,
wherein the correspondence relationship is based on a number of symbols of the DMRS, and
wherein the greater the symbol duration of the PUSCH, the greater an allocation space between the one DMRS and another DMRS.

4. A radio communication method for a terminal comprising:
controlling a mapping of a first demodulation reference signal (DMRS), having a fixed location regardless of a symbol duration of an uplink shared channel (PUSCH), and controlling a mapping of a second DMRS, which is allocated depending on the symbol duration of the PUSCH, and a location of the second DMRS is determined if the second DMRS is allocated; and
transmitting at least one of the first DMRS and the second DMRS when a number of symbols of the PUSCH is greater or equal to 4 and not transmitting either the first DMRS or the second DMRS when the number of symbols of the PUSCH is less than 4,
wherein the mapping of the first DMRS and the second DMRS are controlled using a correspondence relationship between the symbol duration of the PUSCH and a DMRS position information,
wherein the correspondence relationship is based on a number of symbols of the DMRS, and
wherein the greater the symbol duration of the PUSCH, the greater an allocation space between the first DMRS and the second DMRS.

5. A radio communication method for a terminal comprising:
controlling a mapping of a plurality of demodulation reference signals (DMRSs) if a symbol duration of an uplink shared channel (PUSCH) is greater than, or equal to, a predetermined value, and controlling a mapping of one DMRS if the symbol duration of the PUSCH is less than the predetermined value; and
transmitting the plurality of DMRSs or the one DMRS when a number of symbols of the PUSCH is greater or equal to 4 and not transmitting either the plurality of DMRSs or the one DMRS when the number of symbols of the PUSCH is less than 4,
wherein the mapping of the plurality of DMRSs and the one DMRS are controlled using a correspondence relationship between the symbol duration of the PUSCH and a DMRS position information,
wherein the correspondence relationship is based on a number of symbols of the DMRS, and
wherein the greater the symbol duration of the PUSCH, the greater an allocation space between the one DMRS and another DMRS.

6. A system comprising a terminal and a base station, wherein:
the terminal comprises:
a processor that controls a mapping of a first demodulation reference signal (DMRS), having a fixed location regardless of a symbol duration of an uplink shared channel (PUSCH), controls a mapping of a second DMRS, which is allocated depending on the symbol duration of the PUSCH, and determines a location of the second DMRS if the second DMRS is allocated; and a transmitter that transmits at least one of the first DMRS and the second DMRS when a number of symbols of the PUSCH is greater or equal to 4 and does not transmit either the first DMRS or the second DMRS when the number of symbols of the PUSCH is less than 4; and the base station comprises:
    a receiver that receives the at least one of the first DMRS and the second DMRS when the number of symbols of the PUSCH is greater or equal to 4, wherein the processor of the terminal controls the mapping of the first DMRS and the second DMRS using a correspondence relationship between the symbol duration of the PUSCH and a DMRS position information, wherein the correspondence relationship is based on a number of symbols of the DMRS, and wherein the greater the symbol duration of the PUSCH, the greater an allocation space between the first DMRS and the second DMRS.

7. A system comprising a terminal and a base station, wherein:

the terminal comprises:
    a processor that controls a mapping of a plurality of demodulation reference signals (DMRSs) if a symbol duration of an uplink shared channel (PUSCH) is greater than, or equal to, a predetermined value, and controls a mapping of one DMRS if the symbol duration of the PUSCH is less than the predetermined value; and
    a transmitter that transmits the plurality of DMRSs or the one DMRS when a number of symbols of the PUSCH is greater or equal to 4 and does not transmit either the plurality of DMRSs or the one DMRS when the number of symbols of the PUSCH is less than 4; and the base station comprises:
    a receiver that receives the plurality of DMRSs or the one DMRS when the number of symbols of the PUSCH is greater or equal to 4, wherein the processor of the terminal controls the mapping of the plurality of DMRSs and the one DMRS using a correspondence relationship between the symbol duration of the PUSCH and a DMRS position information, wherein the correspondence relationship is based on a number of symbols of the DMRS, and wherein the greater the symbol duration of the PUSCH, the greater an allocation space between the one DMRS and another DMRS.

\* \* \* \* \*